US012721339B2

(12) United States Patent
Huang et al.

(10) Patent No.: US 12,721,339 B2
(45) **Date of Patent: *Sep. 1, 2026**

(54) METHOD FOR MITIGATING HERBICIDE DAMAGE TO COTTON

(71) Applicant: CH Biotech R&D Co., Ltd., Nantou City (TW)

(72) Inventors: Jenn Wen Huang, Taichung (TW); Yi-Chiao Chan, Keelung (TW); Jie-Chao You, New Taipei City (TW)

(73) Assignee: CH Biotech R&D Co., Ltd., Nantou City (TW)

( * ) Notice: Subject to any disclaimer, the term of this patent is extended or adjusted under 35 U.S.C. 154(b) by 246 days.

This patent is subject to a terminal disclaimer.

(21) Appl. No.: 18/668,598

(22) Filed: May 20, 2024

(65) Prior Publication Data

US 2025/0204522 A1 Jun. 26, 2025

(30) Foreign Application Priority Data

Dec. 22, 2023 (TW) ................................ 112150386

(51) Int. Cl.
*A01N 25/32* (2006.01)
*A01N 25/02* (2006.01)
*A01P 21/00* (2006.01)

(52) U.S. Cl.
CPC ............ *A01N 25/32* (2013.01); *A01N 25/02* (2013.01); *A01P 21/00* (2021.08)

(58) Field of Classification Search
CPC .......... A01N 25/32; A01N 25/02; A01P 21/00
See application file for complete search history.

(56) References Cited

FOREIGN PATENT DOCUMENTS

WO WO 2023/001946 * 1/2023 ............... C12N 9/54

OTHER PUBLICATIONS

Metomo et al. Journal of Enviromental Management v366, 2024 14 pages.*

* cited by examiner

*Primary Examiner* — Shirley V Gembeh
(74) *Attorney, Agent, or Firm* — Jen-Feng Lee, Esq.

(57) ABSTRACT

Present invention teaches the method of using a keratin hydrolysis peptide ("KHP") solution to mitigate the damages to cotton plants caused by herbicide used to control weeds. By selectively choosing specific weights of feathers and water, and treating the mixture to a high-temperature high-pressure hydrolysis process, the resulting solution is confirmed to contain at least 253 peptides and then apply to the cotton plants either by infusing to the soil or by leaf spray to the cotton plant at seedling stage. Optionally, the KHP solution can be diluted by water, as disclosed in the specification, for soil infusing or leaf spraying.

6 Claims, 2 Drawing Sheets

Specification includes a Sequence Listing.

METHOD FOR MITIGATING HERBICIDE DAMAGE TO COTTON

PRIORITY CLAIM TO FOREIGN APPLICATION

Applicant hereby makes priority claim to a Taiwan application, number 112150386, having the Taiwan filing date of Dec. 22, 2023.

SEQUENCE LISTING/INCORPORATION BY REFERENCE

Table I (in Sequence Listing XML format) shows the at least 253 peptides and its annotated sequences for the solution generated in accordance with the disclosure of this application. The Sequence Listing XML file complies with the WIPO ST.26 requirements. Said XML copy, created on Mar. 17, 2024, is named Table-I-253_sequence and is 216 bytes in size.

Applicant hereby incorporates by reference said Sequence Listing XML file in its entirety as part of the disclosure and specification of the present application

BACKGROUND OF THE INVENTION

Present invention disclosed and claimed the method and application of a keratin hydrolysis peptide ("KHP") solution to mitigate cotton damages due to herbicides. Such mitigation is especially effective when the KHP solution is applied, either by soil infusion or by foliar spray, to the cotton plants, resulting in the reduction of damages to above-ground biomass and under-ground roots under the stress of herbicides.

Weeds are ever-present in farm lands, competing against the intended crops for light, water, nutrients and growth space. Weeds also serve as the breeding grounds of germs, vermin and rodents that feed on crops, causing economic damages greatly. During the cotton's growth cycles, weeds traditionally posed a major problem to the effective harvesting of cotton.

In the cotton growing industries, people have been using herbicides to control the growth and spreading of weeds for decades. The amount of herbicides usage needs to be accurate: excessive usage would lead to injuries to the cotton crops whereas low dosage would not provide any hindrance to the weeds' growth and development.

Also, the timing of herbicides application is critical. If the herbicide application timing is improper, there will be direct injuries to the cotton plants' development, reducing photosynthesis and other metabolisms while the weeds' growth is not affected. In other words, the herbicide's application timing should be set at a stage where the cotton plant is most resistant to the herbicides and the weeds are most vulnerable.

The inventors of present application found out that, at an early growth stage, the KHP solution made as taught herein can be applied to cotton plants, to effectively reduce and mitigate the damages caused by the herbicide and in fact contributed to better development of cotton's biomass, both underground and above-ground portions.

Hydrolyzed keratin has long been used to strengthen hairs, reduce hair splitting and breakage. Other beneficial uses include skin moisturization and wound healing. Keratin hydrolysate has also been known to function as a biofertilizer, boosting plants' growth by enhancing the plants' ability to receive and utilize nutrients, including commonly applied fertilizers.

The KHP solution is made by a hydrolysis process using feathers and water, via a high-temperature and high-pressure process, resulting in a solution that has many beneficial applications in the fields of horticulture, agriculture and potentially other farming businesses.

As disclosed herein, the application of the KHP solutions can be done by infusing to the soil of young cotton plants, or by spraying to the leaf surface of cotton plants.

SUMMARY OF THE INVENTION

The keratin solution is primarily based upon feather, which contains 85-91% keratin, 13-15% organic nitrogen, 1.6-2% organic sulfur, as well as other materials. The high keratin content has drawn many prior researches that work to break down, by enzyme, chemical agents, or fermentation process, into peptides, amino acids and other smaller molecules that can be used for animal feeds, plant fertilizers, and cultivation bases.

Around 2019, Nurdiawati, et al, came up with a hydrolysis process, by the mixture of α-amylase and protease to hydrolyze feather waste, resulting in a mixture of amino acids, fatty acids, and sugars. Nurdiawati experimented and adopted certain specific high-temperature and high-pressure setting in the hydrolysis process and discovered that the resulting solution, when mixed with some potassium and other minerals, can boost the growth of Pogostemon cablin and *Vigna radiata*, as reported in International Journal of Recycling or Organic Waste in Agriculture (8:221-232, 2019).

The inventors of present application, under the aegis of CH Biotech, developed and selected different feather and water compositions to perform the hydrolysis at higher temperature and higher pressure setting, resulting with different keratin hydrolysis peptide ("KHP") solution that can be used on different crops/plants.

The selected embodiment of present invention uses a mixture of water and feathers, and subject the mixture to a thermal hydrolysis process to create KHP solutions based upon temperature/pressure parameters as noted below.

The inventors used Dionex UltiMate 3000 UPLC to separate the peptides; an analysis is done via Thermo Orbitrap Fusion Lumos Tribrid Orbitrap mass spectrometry to identify the peptides, which are then subsequently confirmed by looking up the BIOPEP-UWM database.

The application of the KHP solution can be diluted. The range of dilution ratio between 50 times and-800 times (noted as 50×-800×) of water by volume can be done, with a preferred narrower range of 50×-500×. In present application, the inventors tested, and confirmed, the specific dilution ratio of 100× and 500×.

BRIEF DESCRIPTION OF DRAWINGS

The accompanying drawings, figures and tables, which are incorporated in and constitute a part of this specification, illustrate and exemplify the preferred embodiments of the invention. Together with the description, serve to explain the principles of the invention.

DETAILED DESCRIPTION OF THE INVENTION

Figure 1A:
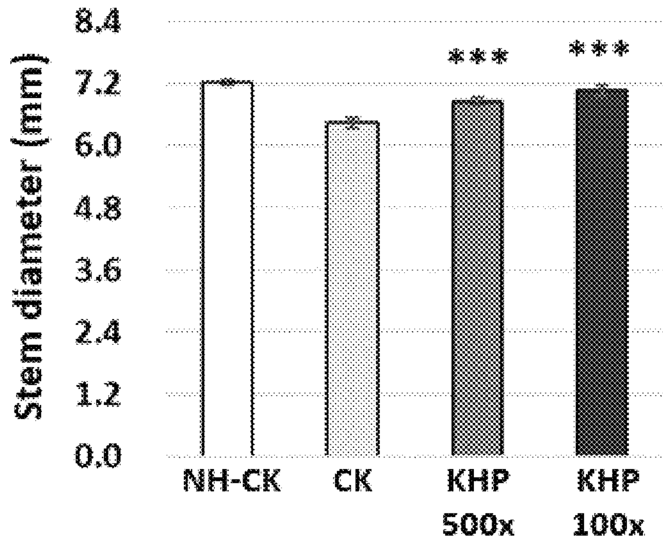
FIG. 1A shows the comparison of stem widths among the different groups.

The keratin hydrolysis peptide ("KHP") solution of present invention is made by a high-temperature and high-pressure process to treat a mixture of water and feathers as shown in the parameters herein.

The mixture ratio, temperature, pressure and duration parameters can have the three sets below:

| | Feather (kg) | Water (kg) | Water content in feather (%) | Pressure (kg/cm$^2$) | Temp. (° C.) | Time (min) | Mass (Da) | Concen. (ppm) |
|---|---|---|---|---|---|---|---|---|
| | 66 | 44 | 50% | 16 | 195 | 40 | 593.3~3828.0 | 200000 |
| KHP solution | 50 | 40 | 50% | 12 | 185 | 80 | 593.3~3508.9 | 301500 |
| | 70 | 0 | 46% | 13 | 180 | 40 | 705.9~3194.7 | 381250 |

The KHP solution in present application embodied the second set of parameters shown here and takes the steps of:

a. Preparing the KHP solution by mixing 50 kg of feathers whose content is 50% water and 40 kg of water in a sealed container;

b. hydrolyzing the mixture in the container with a temperature and pressure setting of 185° C. and 12 kg/cm$^2$ for a duration of 80 minutes;

c. using a mass spectrometer to confirm the combination of peptides in the solution to contain at least 253 peptides as listed in the specification where their molecular masses are between 500 and 4,000 Daltons, and the concentration is in the range of $2.0\times10^5$~$4.5\times10^5$ ppm.

The keratin hydrolysis peptide (KHP) solution of the second embodiment is further filtered and concentrated to 301,500 ppm concentration.

The confirmation of some of the 253 peptides is further done by referencing the BIOPEP-UWM database.

The KHP solution in the selected embodiment can be diluted with water at the ratio of between 50 times to 800 times, denoted as 50×-800×, before application to the cotton plants. A preferred and narrower range is 50×-500×.

The inventors tested the KHP solutions by two methods of application to combat the adverse impact of herbicides: soil infusion and leaf spray.

For the soil infusion method of testing the mitigation effect, the KHP solution can be applied to the soil when young cotton seedlings are grown; immediately thereafter, herbicides are sprayed onto the leaves of the cotton seedlings.

For the leaf spray method of testing the mitigation effect, the KHP solution can be mixed with the herbicide in a liquid form, then sprayed to the surface of the cotton leaves.

The inventors selected the cotton species of Deltapine 1646 B2XF, to test the mitigation effective of KHP solution when the herbicide of Roundup Power Max is used.

The inventors prepared 5-inch starter pots to seed the cottons, giving them the growth environment of 16 hours day time, at 28° C., and 8 hours of night time, at of 25° C.

When the first true leaf appears, which is roughly the 22$^{nd}$ day after seeding, the cotton seedlings are transplanted into regular pots for experiments, where 0.13 g of HauBao No. 2 fertilizer is given to each regular pot.

The inventors divide the pots into four (4) groups:

NH-CK: Neither Herbicide nor KHP solution was given; cotton grows in a normal setting.

KHP_500×: herbicide applied; the KHP solution, at 500× dilution, applied.

KHP_100×: herbicide applied; the KHP solution, at 100× dilution, applied.

CK: herbicide applied; water is given in lieu of KHP solution.

With the four groups as defined above, the KHP solution is applied to cotton seedlings in the conditions set forth below.

For leaf spray, the Roundup Power Max, diluted 120 times with water, is thoroughly mixed with KHP_500× solution. For each cotton seedling, 2 ml of the mixed solution is sprayed on it by using a spray gun.

For soil infusion, each regular pot is infused with 100 ml of KHP_100× solution. Immediately after the infusion, 2 ml of the Roundup Power Max, diluted 120 times with water, is sprayed onto the cotton seedling.

The table below summarized the conditions of the KHP solution application:

| Group | Treatment | Herbicide |
|---|---|---|
| NH-CK (normal setting) | — | No |
| CK (Check group) | Water | Roundup Power Max 120x dilution |
| KHP_500x | KHP_500x/2 ml Leaf Spray | |
| KHP_100x | KHP_100x/100 ml Soil Infusion | |

On the 21$^{st}$ day after the treatment, measurements are taken from all the group to confirm the effectiveness of the application of KHP solution.

The digital scale AP224X (Shimadazu) is used to measure both the above-ground and underground biomass. The main stems and leaves are photographed and observed, using WinFOLIA Pro 2014a (Regent Instruments, Inc.) to compute and analyze leaf surface areas. The results are then tabulated into the figures as presented herein.

The stem widths from the groups are shown in FIG. 1A. As can be seen, the two KHP groups (KHP_500× and KHP_100×) both show cotton seedlings' stem width better than the CK group where only herbicide was given.

Figure 1B:
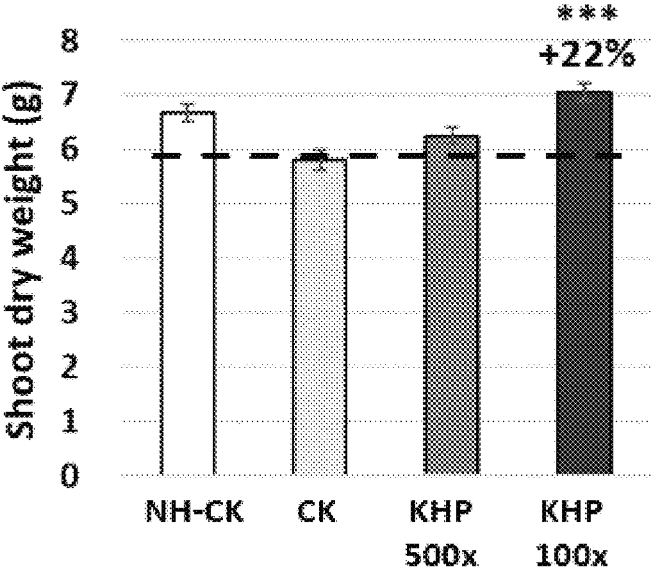
FIG. 1B shows comparison of dry weights of the above-ground biomass among the different groups.

FIG. 1B shows the comparisons of above-ground biomass weights. The dotted line serves as a bench mark indicating the two KHP groups (KHP_500× and KHP_100×) produced higher biomass. The KHP_100× exhibits substantial increase of biomass weight by 22% over that of the CK group, and in fact is at the same performance level as the NH-CK group where no herbicide is applied.

On the 21$^{st}$ day after the treatment, the inventors computed the surface areas from the 3rd to the 10th leaves of the main stem and tabulated the analysis results.

Figure 2:
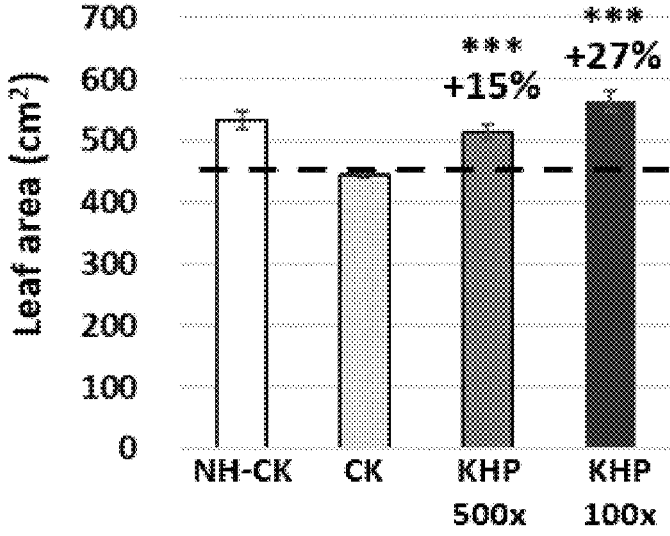
FIG. 2 shows the comparison of surface areas calculated from the 3rd to 10th leaves among the different groups.

As shown in FIG. 2, the leaf areas, computed from the 3rd to the 10th leaves, show substantial improvement range of between 15%-27% over that of the CK group and are close to the normal setting NH-CK group.

Figure 3:
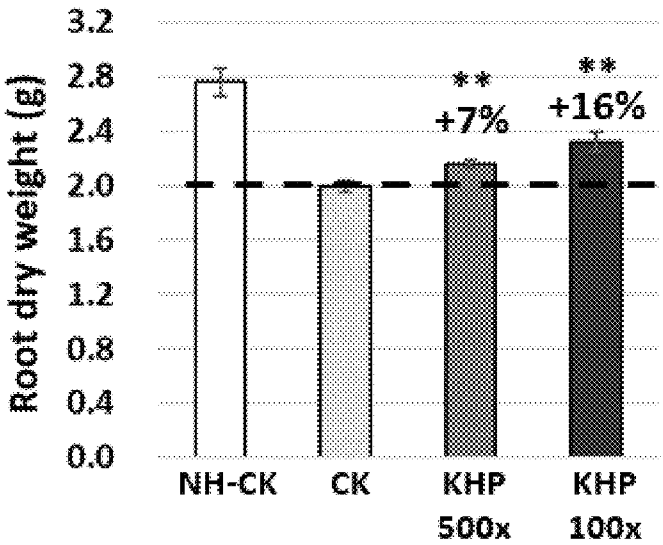
FIG. 3 shows the comparison of dry weights of the underground dry weights among the different groups.

The measurements of underground biomass weights are shown in FIG. 3. The KHP_500× and KHP_100× both effectively reduced the harms inflicted by herbicide with eh biomass weights' increase of 7% and 16%, respectively, over that of the CK group.

Based upon the tests and experiments done by the inventors, it is confirmed that application of the KHP solutions, at the dilution ratios and the growth stage as disclosed herein, effectively remedied the injuries to cotton plants while the goal of controlling weeds is achieved.

While the disclosure herein gave limited teachings and embodiment examples, it should be noted that the description and disclosure made herein illustrated the preferred embodiments of the invention and are not meant to limit the scope of the applicant's rights. Variations and alterations may be employed for yet additional embodiments without departing from the scope of the invention herein.

The invention claimed is:

1. A method of using a keratin hydrolysis peptide (KHP) solution to mitigate the damages to cotton plants caused by herbicide, comprising the steps of:

a. Preparing the KHP solution by mixing 50 kg of feathers whose content is 50% water and 40 kg of water in a sealed container;

b. hydrolyzing the mixture in the container with a temperature and pressure setting of 185° C. and 12 kg/cm$^2$ for a duration of 80 minutes;

c. using a mass spectrometer to confirm the combination of peptides in the solution to contain at least 253 peptides as listed in the specification where their molecular masses are between 500 and 4,000 Daltons, and the concentration is in the range of $2.0\times10^5$~$4.5\times10^5$ ppm; and d. applying the KHP solution by spraying to the leaves of cotton seedlings.

2. The method of using a keratin hydrolysis peptide solution of claim 1 wherein the leaf spray is done around the time of the cotton seedling's true leaf appearance.

3. The method of using a keratin hydrolysis peptide solution of claim 2 wherein the solution is diluted with water by volume at the ratio of 1:50-500.

4. A method of using a keratin hydrolysis peptide (KHP) solution to mitigate the damages to cotton plants caused by herbicide, comprising the steps of:

a. Preparing the KHP solution by mixing 50 kg of feathers whose content is 50% water and 40 kg of water in a sealed container;

b. hydrolyzing the mixture in the container with a temperature and pressure setting of 185° C. and 12 kg/$cm^2$ for a duration of 80 minutes;

c. using a mass spectrometer to confirm the combination of peptides in the solution to contain at least 253 peptides as listed in the specification where their molecular masses are between 500 and 4,000 Daltons, and the concentration is in the range of $2.0\times10^5$~$4.5\times10^5$ ppm; and d. infusing the KHP solution to the soil containing cotton seedlings.

5. The method of using a keratin hydrolysis peptide solution of claim 4 wherein the soil infusion is done around time of the cotton seedling's true leaf appearance.

6. The method of using a keratin hydrolysis peptide solution of claim 5 wherein the solution is diluted with water by volume at the ratio of 1:50-500.

* * * * *

SEQUENCE LISTING

```
Sequence total quantity: 253
SEQ ID NO: 1            moltype = AA  length = 6
FEATURE                 Location/Qualifiers
source                  1..6
                        mol_type = protein
                        organism = Gallus gallus
SEQUENCE: 1
FGLSGL                                                                  6

SEQ ID NO: 2            moltype = AA  length = 7
FEATURE                 Location/Qualifiers
source                  1..7
                        mol_type = protein
                        organism = Gallus gallus
SEQUENCE: 2
AAVGSSL                                                                 7

SEQ ID NO: 3            moltype = AA  length = 7
FEATURE                 Location/Qualifiers
source                  1..7
                        mol_type = protein
                        organism = Gallus gallus
SEQUENCE: 3
TAVGSST                                                                 7

SEQ ID NO: 4            moltype = AA  length = 6
FEATURE                 Location/Qualifiers
source                  1..6
                        mol_type = protein
                        organism = Gallus gallus
SEQUENCE: 4
LSLSSQ                                                                  6

SEQ ID NO: 5            moltype = AA  length = 7
FEATURE                 Location/Qualifiers
source                  1..7
                        mol_type = protein
                        organism = Gallus gallus
SEQUENCE: 5
FGISGLG                                                                 7

SEQ ID NO: 6            moltype = AA  length = 6
FEATURE                 Location/Qualifiers
source                  1..6
                        mol_type = protein
                        organism = Gallus gallus
SEQUENCE: 6
PILSSF                                                                  6

SEQ ID NO: 7            moltype = AA  length = 7
FEATURE                 Location/Qualifiers
source                  1..7
                        mol_type = protein
                        organism = Gallus gallus
SEQUENCE: 7
SLLSQGA                                                                 7

SEQ ID NO: 8            moltype = AA  length = 6
FEATURE                 Location/Qualifiers
source                  1..6
                        mol_type = protein
                        organism = Gallus gallus
SEQUENCE: 8
FNLRGA                                                                  6
```

```
SEQ ID NO: 9            moltype = AA  length = 8
FEATURE                 Location/Qualifiers
source                  1..8
                        mol_type = protein
                        organism = Gallus gallus
SEQUENCE: 9
SAAVGSSL                                                                8

SEQ ID NO: 10           moltype = AA  length = 6
FEATURE                 Location/Qualifiers
source                  1..6
                        mol_type = protein
                        organism = Gallus gallus
SEQUENCE: 10
SRVVIQ                                                                  6

SEQ ID NO: 11           moltype = AA  length = 6
FEATURE                 Location/Qualifiers
source                  1..6
                        mol_type = protein
                        organism = Gallus gallus
SEQUENCE: 11
SRVVLE                                                                  6

SEQ ID NO: 12           moltype = AA  length = 8
FEATURE                 Location/Qualifiers
source                  1..8
                        mol_type = protein
                        organism = Gallus gallus
SEQUENCE: 12
GFGISGLG                                                                8

SEQ ID NO: 13           moltype = AA  length = 6
FEATURE                 Location/Qualifiers
source                  1..6
                        mol_type = protein
                        organism = Gallus gallus
SEQUENCE: 13
SRFSGR                                                                  6

SEQ ID NO: 14           moltype = AA  length = 6
FEATURE                 Location/Qualifiers
source                  1..6
                        mol_type = protein
                        organism = Gallus gallus
SEQUENCE: 14
RVVIQP                                                                  6

SEQ ID NO: 15           moltype = AA  length = 8
FEATURE                 Location/Qualifiers
source                  1..8
                        mol_type = protein
                        organism = Gallus gallus
SEQUENCE: 15
SAAVGSIL                                                                8

SEQ ID NO: 16           moltype = AA  length = 7
FEATURE                 Location/Qualifiers
source                  1..7
                        mol_type = protein
                        organism = Gallus gallus
SEQUENCE: 16
IVVIGHV                                                                 7

SEQ ID NO: 17           moltype = AA  length = 9
FEATURE                 Location/Qualifiers
source                  1..9
                        mol_type = protein
                        organism = Gallus gallus
SEQUENCE: 17
TAVGSSTSA                                                               9

SEQ ID NO: 18           moltype = AA  length = 7
FEATURE                 Location/Qualifiers
source                  1..7
                        mol_type = protein
                        organism = Gallus gallus
SEQUENCE: 18
```

```
RVVIQPS                                                         7

SEQ ID NO: 19           moltype = AA  length = 7
FEATURE                 Location/Qualifiers
source                  1..7
                        mol_type = protein
                        organism = Gallus gallus
SEQUENCE: 19
SRVVIQP                                                         7

SEQ ID NO: 20           moltype = AA  length = 7
FEATURE                 Location/Qualifiers
source                  1..7
                        mol_type = protein
                        organism = Gallus gallus
SEQUENCE: 20
PQGEQLQ                                                         7

SEQ ID NO: 21           moltype = AA  length = 9
FEATURE                 Location/Qualifiers
source                  1..9
                        mol_type = protein
                        organism = Gallus gallus
SEQUENCE: 21
RAGAGPPSP                                                       9

SEQ ID NO: 22           moltype = AA  length = 7
FEATURE                 Location/Qualifiers
source                  1..7
                        mol_type = protein
                        organism = Gallus gallus
SEQUENCE: 22
DSRVVIQ                                                         7

SEQ ID NO: 23           moltype = AA  length = 8
FEATURE                 Location/Qualifiers
source                  1..8
                        mol_type = protein
                        organism = Gallus gallus
SEQUENCE: 23
PGPILSSF                                                        8

SEQ ID NO: 24           moltype = AA  length = 9
FEATURE                 Location/Qualifiers
source                  1..9
                        mol_type = protein
                        organism = Gallus gallus
SEQUENCE: 24
PISSGGFGI                                                       9

SEQ ID NO: 25           moltype = AA  length = 8
FEATURE                 Location/Qualifiers
source                  1..8
                        mol_type = protein
                        organism = Gallus gallus
SEQUENCE: 25
ISGLGSRF                                                        8

SEQ ID NO: 26           moltype = AA  length = 10
FEATURE                 Location/Qualifiers
source                  1..10
                        mol_type = protein
                        organism = Gallus gallus
SEQUENCE: 26
SGGFGISGLG                                                      10

SEQ ID NO: 27           moltype = AA  length = 7
FEATURE                 Location/Qualifiers
source                  1..7
                        mol_type = protein
                        organism = Gallus gallus
SEQUENCE: 27
SRFSGRR                                                         7

SEQ ID NO: 28           moltype = AA  length = 9
FEATURE                 Location/Qualifiers
source                  1..9
                        mol_type = protein
                        organism = Gallus gallus
```

```
SEQUENCE: 28
PGLALPVLP                                                          9

SEQ ID NO: 29           moltype = AA  length = 8
FEATURE                 Location/Qualifiers
source                  1..8
                        mol_type = protein
                        organism = Gallus gallus
SEQUENCE: 29
SRVVIQPS                                                           8

SEQ ID NO: 30           moltype = AA  length = 8
FEATURE                 Location/Qualifiers
source                  1..8
                        mol_type = protein
                        organism = Gallus gallus
SEQUENCE: 30
PILSSFPQ                                                           8

SEQ ID NO: 31           moltype = AA  length = 8
FEATURE                 Location/Qualifiers
source                  1..8
                        mol_type = protein
                        organism = Gallus gallus
SEQUENCE: 31
LGSGIFWI                                                           8

SEQ ID NO: 32           moltype = AA  length = 9
FEATURE                 Location/Qualifiers
source                  1..9
                        mol_type = protein
                        organism = Gallus gallus
SEQUENCE: 32
GISGLGSRF                                                          9

SEQ ID NO: 33           moltype = AA  length = 9
FEATURE                 Location/Qualifiers
source                  1..9
                        mol_type = protein
                        organism = Gallus gallus
SEQUENCE: 33
VVVTLPGPI                                                          9

SEQ ID NO: 34           moltype = AA  length = 8
FEATURE                 Location/Qualifiers
source                  1..8
                        mol_type = protein
                        organism = Gallus gallus
SEQUENCE: 34
CRLSLSQP                                                           8

SEQ ID NO: 35           moltype = AA  length = 11
FEATURE                 Location/Qualifiers
source                  1..11
                        mol_type = protein
                        organism = Gallus gallus
SEQUENCE: 35
SAAVGSSLSA G                                                       11

SEQ ID NO: 36           moltype = AA  length = 11
FEATURE                 Location/Qualifiers
source                  1..11
                        mol_type = protein
                        organism = Gallus gallus
SEQUENCE: 36
AVGSSTSAAV G                                                       11

SEQ ID NO: 37           moltype = AA  length = 9
FEATURE                 Location/Qualifiers
source                  1..9
                        mol_type = protein
                        organism = Gallus gallus
SEQUENCE: 37
VVTLPGPIL                                                          9

SEQ ID NO: 38           moltype = AA  length = 9
FEATURE                 Location/Qualifiers
source                  1..9
                        mol_type = protein
```

-continued

```
                      organism = Gallus gallus
SEQUENCE: 38
PGPILSSFP                                                     9

SEQ ID NO: 39         moltype = AA  length = 10
FEATURE               Location/Qualifiers
source                1..10
                      mol_type = protein
                      organism = Gallus gallus
SEQUENCE: 39
SAAVGSILSE                                                    10

SEQ ID NO: 40         moltype = AA  length = 10
FEATURE               Location/Qualifiers
source                1..10
                      mol_type = protein
                      organism = Gallus gallus
SEQUENCE: 40
VPISSGGFGI                                                    10

SEQ ID NO: 41         moltype = AA  length = 8
FEATURE               Location/Qualifiers
source                1..8
                      mol_type = protein
                      organism = Gallus gallus
SEQUENCE: 41
QLAQRNTI                                                      8

SEQ ID NO: 42         moltype = AA  length = 9
FEATURE               Location/Qualifiers
source                1..9
                      mol_type = protein
                      organism = Gallus gallus
SEQUENCE: 42
LSGLRSNLS                                                     9

SEQ ID NO: 43         moltype = AA  length = 10
FEATURE               Location/Qualifiers
source                1..10
                      mol_type = protein
                      organism = Gallus gallus
SEQUENCE: 43
PSPVVVTLPG                                                    10

SEQ ID NO: 44         moltype = AA  length = 10
FEATURE               Location/Qualifiers
source                1..10
                      mol_type = protein
                      organism = Gallus gallus
SEQUENCE: 44
PPPVVVTLPG                                                    10

SEQ ID NO: 45         moltype = AA  length = 10
FEATURE               Location/Qualifiers
source                1..10
                      mol_type = protein
                      organism = Gallus gallus
SEQUENCE: 45
ISGLGSRFSG                                                    10

SEQ ID NO: 46         moltype = AA  length = 9
FEATURE               Location/Qualifiers
source                1..9
                      mol_type = protein
                      organism = Gallus gallus
SEQUENCE: 46
LALRQSVEA                                                     9

SEQ ID NO: 47         moltype = AA  length = 10
FEATURE               Location/Qualifiers
source                1..10
                      mol_type = protein
                      organism = Gallus gallus
SEQUENCE: 47
PLLGPPLLGI                                                    10

SEQ ID NO: 48         moltype = AA  length = 10
FEATURE               Location/Qualifiers
source                1..10
```

```
                        mol_type = protein
                        organism = Gallus gallus
SEQUENCE: 48
VVTLPGPILS                                                      10

SEQ ID NO: 49           moltype = AA  length = 8
FEATURE                 Location/Qualifiers
source                  1..8
                        mol_type = protein
                        organism = Gallus gallus
SEQUENCE: 49
VTLEDLRR                                                        8

SEQ ID NO: 50           moltype = AA  length = 9
FEATURE                 Location/Qualifiers
source                  1..9
                        mol_type = protein
                        organism = Gallus gallus
SEQUENCE: 50
PILSSFPQN                                                       9

SEQ ID NO: 51           moltype = AA  length = 9
FEATURE                 Location/Qualifiers
source                  1..9
                        mol_type = protein
                        organism = Gallus gallus
SEQUENCE: 51
PILSSFPQD                                                       9

SEQ ID NO: 52           moltype = AA  length = 11
FEATURE                 Location/Qualifiers
source                  1..11
                        mol_type = protein
                        organism = Gallus gallus
SEQUENCE: 52
GTVGVSAGVT R                                                    11

SEQ ID NO: 53           moltype = AA  length = 9
FEATURE                 Location/Qualifiers
source                  1..9
                        mol_type = protein
                        organism = Gallus gallus
SEQUENCE: 53
FGLSRVTLN                                                       9

SEQ ID NO: 54           moltype = AA  length = 12
FEATURE                 Location/Qualifiers
source                  1..12
                        mol_type = protein
                        organism = Gallus gallus
SEQUENCE: 54
TAVGSSTSAA VG                                                   12

SEQ ID NO: 55           moltype = AA  length = 10
FEATURE                 Location/Qualifiers
source                  1..10
                        mol_type = protein
                        organism = Gallus gallus
SEQUENCE: 55
VVVTLPGPIL                                                      10

SEQ ID NO: 56           moltype = AA  length = 10
FEATURE                 Location/Qualifiers
source                  1..10
                        mol_type = protein
                        organism = Gallus gallus
SEQUENCE: 56
PPVVVTFPGP                                                      10

SEQ ID NO: 57           moltype = AA  length = 10
FEATURE                 Location/Qualifiers
source                  1..10
                        mol_type = protein
                        organism = Gallus gallus
SEQUENCE: 57
PPPVVVTFPG                                                      10

SEQ ID NO: 58           moltype = AA  length = 10
FEATURE                 Location/Qualifiers
```

-continued

```
source                 1..10
                       mol_type = protein
                       organism = Gallus gallus
SEQUENCE: 58
VVIQPSPVVV                                                                 10

SEQ ID NO: 59          moltype = AA  length = 10
FEATURE                Location/Qualifiers
source                 1..10
                       mol_type = protein
                       organism = Gallus gallus
SEQUENCE: 59
FGISGLGSRF                                                                 10

SEQ ID NO: 60          moltype = AA  length = 10
FEATURE                Location/Qualifiers
source                 1..10
                       mol_type = protein
                       organism = Gallus gallus
SEQUENCE: 60
PGPILSSFPQ                                                                 10

SEQ ID NO: 61          moltype = AA  length = 10
FEATURE                Location/Qualifiers
source                 1..10
                       mol_type = protein
                       organism = Gallus gallus
SEQUENCE: 61
FGWSGLGRGL                                                                 10

SEQ ID NO: 62          moltype = AA  length = 9
FEATURE                Location/Qualifiers
source                 1..9
                       mol_type = protein
                       organism = Gallus gallus
SEQUENCE: 62
LEAQLSELR                                                                  9

SEQ ID NO: 63          moltype = AA  length = 9
FEATURE                Location/Qualifiers
source                 1..9
                       mol_type = protein
                       organism = Gallus gallus
SEQUENCE: 63
IVGAWYTVR                                                                  9

SEQ ID NO: 64          moltype = AA  length = 11
FEATURE                Location/Qualifiers
source                 1..11
                       mol_type = protein
                       organism = Gallus gallus
SEQUENCE: 64
LLSPPGLPGL L                                                               11

SEQ ID NO: 65          moltype = AA  length = 11
FEATURE                Location/Qualifiers
source                 1..11
                       mol_type = protein
                       organism = Gallus gallus
SEQUENCE: 65
VVVTLPGPIL S                                                               11

SEQ ID NO: 66          moltype = AA  length = 11
FEATURE                Location/Qualifiers
source                 1..11
                       mol_type = protein
                       organism = Gallus gallus
SEQUENCE: 66
GFGISGLGSR F                                                               11

SEQ ID NO: 67          moltype = AA  length = 11
FEATURE                Location/Qualifiers
source                 1..11
                       mol_type = protein
                       organism = Gallus gallus
SEQUENCE: 67
PVVVTLPGPI L                                                               11

SEQ ID NO: 68          moltype = AA  length = 11
```

-continued

```
FEATURE                Location/Qualifiers
source                 1..11
                       mol_type = protein
                       organism = Gallus gallus
SEQUENCE: 68
VSQGEITVPS I                                                        11

SEQ ID NO: 69          moltype = AA  length = 11
FEATURE                Location/Qualifiers
source                 1..11
                       mol_type = protein
                       organism = Gallus gallus
SEQUENCE: 69
SILSEEGVPI S                                                        11

SEQ ID NO: 70          moltype = AA  length = 11
FEATURE                Location/Qualifiers
source                 1..11
                       mol_type = protein
                       organism = Gallus gallus
SEQUENCE: 70
PVVVTFPGPI L                                                        11

SEQ ID NO: 71          moltype = AA  length = 13
FEATURE                Location/Qualifiers
source                 1..13
                       mol_type = protein
                       organism = Gallus gallus
SEQUENCE: 71
PISSGGFGIS GLG                                                      13

SEQ ID NO: 72          moltype = AA  length = 13
FEATURE                Location/Qualifiers
source                 1..13
                       mol_type = protein
                       organism = Gallus gallus
SEQUENCE: 72
VGSSTSAAVG SIL                                                      13

SEQ ID NO: 73          moltype = AA  length = 11
FEATURE                Location/Qualifiers
source                 1..11
                       mol_type = protein
                       organism = Gallus gallus
SEQUENCE: 73
GFLSSAVSLN R                                                        11

SEQ ID NO: 74          moltype = AA  length = 12
FEATURE                Location/Qualifiers
source                 1..12
                       mol_type = protein
                       organism = Gallus gallus
SEQUENCE: 74
GGFGISGLGS RF                                                       12

SEQ ID NO: 75          moltype = AA  length = 11
FEATURE                Location/Qualifiers
source                 1..11
                       mol_type = protein
                       organism = Gallus gallus
SEQUENCE: 75
PGPILSSFPQ N                                                        11

SEQ ID NO: 76          moltype = AA  length = 11
FEATURE                Location/Qualifiers
source                 1..11
                       mol_type = protein
                       organism = Gallus gallus
SEQUENCE: 76
PGPILSSFPQ D                                                        11

SEQ ID NO: 77          moltype = AA  length = 12
FEATURE                Location/Qualifiers
source                 1..12
                       mol_type = protein
                       organism = Gallus gallus
SEQUENCE: 77
GGFGWSGLGR GL                                                       12
```

```
SEQ ID NO: 78           moltype = AA  length = 12
FEATURE                 Location/Qualifiers
source                  1..12
                        mol_type = protein
                        organism = Gallus gallus
SEQUENCE: 78
PSPVVVTLPG PI                                                        12

SEQ ID NO: 79           moltype = AA  length = 12
FEATURE                 Location/Qualifiers
source                  1..12
                        mol_type = protein
                        organism = Gallus gallus
SEQUENCE: 79
VVVTLPGPIL SS                                                        12

SEQ ID NO: 80           moltype = AA  length = 12
FEATURE                 Location/Qualifiers
source                  1..12
                        mol_type = protein
                        organism = Gallus gallus
SEQUENCE: 80
PVVVTLPGPI LS                                                        12

SEQ ID NO: 81           moltype = AA  length = 12
FEATURE                 Location/Qualifiers
source                  1..12
                        mol_type = protein
                        organism = Gallus gallus
SEQUENCE: 81
SPVVVTLPGP IL                                                        12

SEQ ID NO: 82           moltype = AA  length = 11
FEATURE                 Location/Qualifiers
source                  1..11
                        mol_type = protein
                        organism = Gallus gallus
SEQUENCE: 82
RVVIQPSPVV V                                                         11

SEQ ID NO: 83           moltype = AA  length = 11
FEATURE                 Location/Qualifiers
source                  1..11
                        mol_type = protein
                        organism = Gallus gallus
SEQUENCE: 83
QALTEVYAKA N                                                         11

SEQ ID NO: 84           moltype = AA  length = 10
FEATURE                 Location/Qualifiers
source                  1..10
                        mol_type = protein
                        organism = Gallus gallus
SEQUENCE: 84
IETLTQFLGW                                                           10

SEQ ID NO: 85           moltype = AA  length = 13
FEATURE                 Location/Qualifiers
source                  1..13
                        mol_type = protein
                        organism = Gallus gallus
SEQUENCE: 85
GFGSRSLVGL GGT                                                       13

SEQ ID NO: 86           moltype = AA  length = 14
FEATURE                 Location/Qualifiers
source                  1..14
                        mol_type = protein
                        organism = Gallus gallus
SEQUENCE: 86
AVGSSTSAAV GSIL                                                      14

SEQ ID NO: 87           moltype = AA  length = 12
FEATURE                 Location/Qualifiers
source                  1..12
                        mol_type = protein
                        organism = Gallus gallus
SEQUENCE: 87
PVVVTFPGPI LS                                                        12
```

```
SEQ ID NO: 88           moltype = AA  length = 14
FEATURE                 Location/Qualifiers
source                  1..14
                        mol_type = protein
                        organism = Gallus gallus
SEQUENCE: 88
VGSSTSAAVG SILS                                                     14

SEQ ID NO: 89           moltype = AA  length = 13
FEATURE                 Location/Qualifiers
source                  1..13
                        mol_type = protein
                        organism = Gallus gallus
SEQUENCE: 89
GFGISGLGSR FSG                                                      13

SEQ ID NO: 90           moltype = AA  length = 13
FEATURE                 Location/Qualifiers
source                  1..13
                        mol_type = protein
                        organism = Gallus gallus
SEQUENCE: 90
SGGFGISGLG SRF                                                      13

SEQ ID NO: 91           moltype = AA  length = 14
FEATURE                 Location/Qualifiers
source                  1..14
                        mol_type = protein
                        organism = Gallus gallus
SEQUENCE: 91
VPISSGGFGI SGLG                                                     14

SEQ ID NO: 92           moltype = AA  length = 12
FEATURE                 Location/Qualifiers
source                  1..12
                        mol_type = protein
                        organism = Gallus gallus
SEQUENCE: 92
VVIQPSPVVV TL                                                       12

SEQ ID NO: 93           moltype = AA  length = 13
FEATURE                 Location/Qualifiers
source                  1..13
                        mol_type = protein
                        organism = Gallus gallus
SEQUENCE: 93
SILSEEGVPI SSG                                                      13

SEQ ID NO: 94           moltype = AA  length = 13
FEATURE                 Location/Qualifiers
source                  1..13
                        mol_type = protein
                        organism = Gallus gallus
SEQUENCE: 94
VMGCKAAGAS RII                                                      13

SEQ ID NO: 95           moltype = AA  length = 13
FEATURE                 Location/Qualifiers
source                  1..13
                        mol_type = protein
                        organism = Gallus gallus
SEQUENCE: 95
SPVVVTLPGP ILS                                                      13

SEQ ID NO: 96           moltype = AA  length = 12
FEATURE                 Location/Qualifiers
source                  1..12
                        mol_type = protein
                        organism = Gallus gallus
SEQUENCE: 96
SRVVIQPSPV VV                                                       12

SEQ ID NO: 97           moltype = AA  length = 13
FEATURE                 Location/Qualifiers
source                  1..13
                        mol_type = protein
                        organism = Gallus gallus
SEQUENCE: 97
```

```
PSPVVVTLPG PIL                                                     13

SEQ ID NO: 98          moltype = AA  length = 12
FEATURE                Location/Qualifiers
source                 1..12
                       mol_type = protein
                       organism = Gallus gallus
SEQUENCE: 98
RVVIQPSPVV VT                                                      12

SEQ ID NO: 99          moltype = AA  length = 13
FEATURE                Location/Qualifiers
source                 1..13
                       mol_type = protein
                       organism = Gallus gallus
SEQUENCE: 99
PPPVVVTLPG PIL                                                     13

SEQ ID NO: 100         moltype = AA  length = 15
FEATURE                Location/Qualifiers
source                 1..15
                       mol_type = protein
                       organism = Gallus gallus
SEQUENCE: 100
GVPISSGGFG ISGLG                                                   15

SEQ ID NO: 101         moltype = AA  length = 13
FEATURE                Location/Qualifiers
source                 1..13
                       mol_type = protein
                       organism = Gallus gallus
SEQUENCE: 101
VIQPSPVVVT LPG                                                     13

SEQ ID NO: 102         moltype = AA  length = 15
FEATURE                Location/Qualifiers
source                 1..15
                       mol_type = protein
                       organism = Gallus gallus
SEQUENCE: 102
AVGSSTSAAV GSILS                                                   15

SEQ ID NO: 103         moltype = AA  length = 15
FEATURE                Location/Qualifiers
source                 1..15
                       mol_type = protein
                       organism = Gallus gallus
SEQUENCE: 103
TAVGSSTSAA VGSIL                                                   15

SEQ ID NO: 104         moltype = AA  length = 14
FEATURE                Location/Qualifiers
source                 1..14
                       mol_type = protein
                       organism = Gallus gallus
SEQUENCE: 104
SGGFGISGLG SRFS                                                    14

SEQ ID NO: 105         moltype = AA  length = 13
FEATURE                Location/Qualifiers
source                 1..13
                       mol_type = protein
                       organism = Gallus gallus
SEQUENCE: 105
VVVTLPGPIL SSF                                                     13

SEQ ID NO: 106         moltype = AA  length = 13
FEATURE                Location/Qualifiers
source                 1..13
                       mol_type = protein
                       organism = Gallus gallus
SEQUENCE: 106
PPPVVVTFPG PIL                                                     13

SEQ ID NO: 107         moltype = AA  length = 14
FEATURE                Location/Qualifiers
source                 1..14
                       mol_type = protein
                       organism = Gallus gallus
```

```
SEQUENCE: 107
GLGGFGWSGL GRGL                                                    14

SEQ ID NO: 108          moltype = AA  length = 13
FEATURE                 Location/Qualifiers
source                  1..13
                        mol_type = protein
                        organism = Gallus gallus
SEQUENCE: 108
VTLPGPILSS FPQ                                                     13

SEQ ID NO: 109          moltype = AA  length = 14
FEATURE                 Location/Qualifiers
source                  1..14
                        mol_type = protein
                        organism = Gallus gallus
SEQUENCE: 109
AVGSILSEEG VPIS                                                    14

SEQ ID NO: 110          moltype = AA  length = 14
FEATURE                 Location/Qualifiers
source                  1..14
                        mol_type = protein
                        organism = Gallus gallus
SEQUENCE: 110
SLGLGGFGWS GLGR                                                    14

SEQ ID NO: 111          moltype = AA  length = 14
FEATURE                 Location/Qualifiers
source                  1..14
                        mol_type = protein
                        organism = Gallus gallus
SEQUENCE: 111
PSPVVVTLPG PILS                                                    14

SEQ ID NO: 112          moltype = AA  length = 13
FEATURE                 Location/Qualifiers
source                  1..13
                        mol_type = protein
                        organism = Gallus gallus
SEQUENCE: 112
SRVVIQPSPV VVT                                                     13

SEQ ID NO: 113          moltype = AA  length = 15
FEATURE                 Location/Qualifiers
source                  1..15
                        mol_type = protein
                        organism = Gallus gallus
SEQUENCE: 113
SGGFGISGLG SRFSG                                                   15

SEQ ID NO: 114          moltype = AA  length = 14
FEATURE                 Location/Qualifiers
source                  1..14
                        mol_type = protein
                        organism = Gallus gallus
SEQUENCE: 114
PPPVVVTLPG PILS                                                    14

SEQ ID NO: 115          moltype = AA  length = 14
FEATURE                 Location/Qualifiers
source                  1..14
                        mol_type = protein
                        organism = Gallus gallus
SEQUENCE: 115
VAIQPPPVVV TLPG                                                    14

SEQ ID NO: 116          moltype = AA  length = 15
FEATURE                 Location/Qualifiers
source                  1..15
                        mol_type = protein
                        organism = Gallus gallus
SEQUENCE: 116
PISSGGFGIS GLGSR                                                   15

SEQ ID NO: 117          moltype = AA  length = 13
FEATURE                 Location/Qualifiers
source                  1..13
                        mol_type = protein
```

```
                      organism = Gallus gallus
SEQUENCE: 117
PIVDVAEALL HVK                                                     13

SEQ ID NO: 118        moltype = AA  length = 14
FEATURE               Location/Qualifiers
source                1..14
                      mol_type = protein
                      organism = Gallus gallus
SEQUENCE: 118
VVIQPSPVVV TLPG                                                    14

SEQ ID NO: 119        moltype = AA  length = 13
FEATURE               Location/Qualifiers
source                1..13
                      mol_type = protein
                      organism = Gallus gallus
SEQUENCE: 119
RVVIQPSPVV VTL                                                     13

SEQ ID NO: 120        moltype = AA  length = 16
FEATURE               Location/Qualifiers
source                1..16
                      mol_type = protein
                      organism = Gallus gallus
SEQUENCE: 120
TAVGSSTSAA VGSILS                                                  16

SEQ ID NO: 121        moltype = AA  length = 14
FEATURE               Location/Qualifiers
source                1..14
                      mol_type = protein
                      organism = Gallus gallus
SEQUENCE: 121
PPPVVVTFPG PILS                                                    14

SEQ ID NO: 122        moltype = AA  length = 15
FEATURE               Location/Qualifiers
source                1..15
                      mol_type = protein
                      organism = Gallus gallus
SEQUENCE: 122
SLGLGGFGWS GLGRG                                                   15

SEQ ID NO: 123        moltype = AA  length = 14
FEATURE               Location/Qualifiers
source                1..14
                      mol_type = protein
                      organism = Gallus gallus
SEQUENCE: 123
VVVTLPGPIL SSFP                                                    14

SEQ ID NO: 124        moltype = AA  length = 14
FEATURE               Location/Qualifiers
source                1..14
                      mol_type = protein
                      organism = Gallus gallus
SEQUENCE: 124
PVVVTLPGPI LSSF                                                    14

SEQ ID NO: 125        moltype = AA  length = 15
FEATURE               Location/Qualifiers
source                1..15
                      mol_type = protein
                      organism = Gallus gallus
SEQUENCE: 125
AAVGSILSEE GVPIS                                                   15

SEQ ID NO: 126        moltype = AA  length = 15
FEATURE               Location/Qualifiers
source                1..15
                      mol_type = protein
                      organism = Gallus gallus
SEQUENCE: 126
SAAVGSILSE EGVPI                                                   15

SEQ ID NO: 127        moltype = AA  length = 16
FEATURE               Location/Qualifiers
source                1..16
```

```
                        mol_type = protein
                        organism = Gallus gallus
SEQUENCE: 127
EGVPISSGGF GISGLG                                                   16

SEQ ID NO: 128          moltype = AA  length = 14
FEATURE                 Location/Qualifiers
source                  1..14
                        mol_type = protein
                        organism = Gallus gallus
SEQUENCE: 128
VVTLPGPILS SFPQ                                                     14

SEQ ID NO: 129          moltype = AA  length = 15
FEATURE                 Location/Qualifiers
source                  1..15
                        mol_type = protein
                        organism = Gallus gallus
SEQUENCE: 129
PSPVVVTLPG PILSS                                                    15

SEQ ID NO: 130          moltype = AA  length = 16
FEATURE                 Location/Qualifiers
source                  1..16
                        mol_type = protein
                        organism = Gallus gallus
SEQUENCE: 130
GKDGPKGVRG DAGPPG                                                   16

SEQ ID NO: 131          moltype = AA  length = 15
FEATURE                 Location/Qualifiers
source                  1..15
                        mol_type = protein
                        organism = Gallus gallus
SEQUENCE: 131
SVAIQPPPVV VTLPG                                                    15

SEQ ID NO: 132          moltype = AA  length = 14
FEATURE                 Location/Qualifiers
source                  1..14
                        mol_type = protein
                        organism = Gallus gallus
SEQUENCE: 132
SRVVIQPSPV VVTL                                                     14

SEQ ID NO: 133          moltype = AA  length = 14
FEATURE                 Location/Qualifiers
source                  1..14
                        mol_type = protein
                        organism = Gallus gallus
SEQUENCE: 133
LHTEAAATVP DRSE                                                     14

SEQ ID NO: 134          moltype = AA  length = 15
FEATURE                 Location/Qualifiers
source                  1..15
                        mol_type = protein
                        organism = Gallus gallus
SEQUENCE: 134
VVIQPSPVVV TLPGP                                                    15

SEQ ID NO: 135          moltype = AA  length = 14
FEATURE                 Location/Qualifiers
source                  1..14
                        mol_type = protein
                        organism = Gallus gallus
SEQUENCE: 135
RVVIQPSPVV VTLP                                                     14

SEQ ID NO: 136          moltype = AA  length = 16
FEATURE                 Location/Qualifiers
source                  1..16
                        mol_type = protein
                        organism = Gallus gallus
SEQUENCE: 136
SAAVGSILSE EGVPIS                                                   16

SEQ ID NO: 137          moltype = AA  length = 15
FEATURE                 Location/Qualifiers
```

```
source                  1..15
                        mol_type = protein
                        organism = Gallus gallus
SEQUENCE: 137
PVVVTLPGPI LSSFP                                                    15

SEQ ID NO: 138          moltype = AA  length = 15
FEATURE                 Location/Qualifiers
source                  1..15
                        mol_type = protein
                        organism = Gallus gallus
SEQUENCE: 138
IQPSPVVVTL PGPIL                                                    15

SEQ ID NO: 139          moltype = AA  length = 17
FEATURE                 Location/Qualifiers
source                  1..17
                        mol_type = protein
                        organism = Gallus gallus
SEQUENCE: 139
SVPIGAGGSL GLGGFGW                                                  17

SEQ ID NO: 140          moltype = AA  length = 16
FEATURE                 Location/Qualifiers
source                  1..16
                        mol_type = protein
                        organism = Gallus gallus
SEQUENCE: 140
SLGLGGFGWS GLGRGL                                                   16

SEQ ID NO: 141          moltype = AA  length = 17
FEATURE                 Location/Qualifiers
source                  1..17
                        mol_type = protein
                        organism = Gallus gallus
SEQUENCE: 141
FGGGFGGGDG ILPAGEK                                                  17

SEQ ID NO: 142          moltype = AA  length = 17
FEATURE                 Location/Qualifiers
source                  1..17
                        mol_type = protein
                        organism = Gallus gallus
SEQUENCE: 142
TAVGSSTSAA VGSILSE                                                  17

SEQ ID NO: 143          moltype = AA  length = 16
FEATURE                 Location/Qualifiers
source                  1..16
                        mol_type = protein
                        organism = Gallus gallus
SEQUENCE: 143
PISSGGFGIS GLGSRF                                                   16

SEQ ID NO: 144          moltype = AA  length = 19
FEATURE                 Location/Qualifiers
source                  1..19
                        mol_type = protein
                        organism = Gallus gallus
SEQUENCE: 144
SAAVGSSLSA GSVPIGAGG                                                19

SEQ ID NO: 145          moltype = AA  length = 17
FEATURE                 Location/Qualifiers
source                  1..17
                        mol_type = protein
                        organism = Gallus gallus
SEQUENCE: 145
GVPISSGGFG ISGLGSR                                                  17

SEQ ID NO: 146          moltype = AA  length = 15
FEATURE                 Location/Qualifiers
source                  1..15
                        mol_type = protein
                        organism = Gallus gallus
SEQUENCE: 146
VVVTLPGPIL SSFPQ                                                    15

SEQ ID NO: 147          moltype = AA  length = 15
```

```
FEATURE                 Location/Qualifiers
source                  1..15
                        mol_type = protein
                        organism = Gallus gallus
SEQUENCE: 147
RVVIQPSPVV VTLPG                                                    15

SEQ ID NO: 148          moltype = AA  length = 15
FEATURE                 Location/Qualifiers
source                  1..15
                        mol_type = protein
                        organism = Gallus gallus
SEQUENCE: 148
SRVVIQPSPV VVTLP                                                    15

SEQ ID NO: 149          moltype = AA  length = 16
FEATURE                 Location/Qualifiers
source                  1..16
                        mol_type = protein
                        organism = Gallus gallus
SEQUENCE: 149
PSPVVVTLPG PILSSF                                                   16

SEQ ID NO: 150          moltype = AA  length = 16
FEATURE                 Location/Qualifiers
source                  1..16
                        mol_type = protein
                        organism = Gallus gallus
SEQUENCE: 150
AIQPPPVVVT LPGPIL                                                   16

SEQ ID NO: 151          moltype = AA  length = 16
FEATURE                 Location/Qualifiers
source                  1..16
                        mol_type = protein
                        organism = Gallus gallus
SEQUENCE: 151
IQPSPVVVTL PGPILS                                                   16

SEQ ID NO: 152          moltype = AA  length = 16
FEATURE                 Location/Qualifiers
source                  1..16
                        mol_type = protein
                        organism = Gallus gallus
SEQUENCE: 152
VIQPSPVVVT LPGPIL                                                   16

SEQ ID NO: 153          moltype = AA  length = 17
FEATURE                 Location/Qualifiers
source                  1..17
                        mol_type = protein
                        organism = Gallus gallus
SEQUENCE: 153
VPISSGGFGI SGLGSRF                                                  17

SEQ ID NO: 154          moltype = AA  length = 16
FEATURE                 Location/Qualifiers
source                  1..16
                        mol_type = protein
                        organism = Gallus gallus
SEQUENCE: 154
SRVVIQPSPV VVTLPG                                                   16

SEQ ID NO: 155          moltype = AA  length = 17
FEATURE                 Location/Qualifiers
source                  1..17
                        mol_type = protein
                        organism = Gallus gallus
SEQUENCE: 155
SILSEEGVPI SSGGFGI                                                  17

SEQ ID NO: 156          moltype = AA  length = 16
FEATURE                 Location/Qualifiers
source                  1..16
                        mol_type = protein
                        organism = Gallus gallus
SEQUENCE: 156
PVVVTLPGPI LSSFPQ                                                   16
```

```
SEQ ID NO: 157          moltype = AA  length = 16
FEATURE                 Location/Qualifiers
source                  1..16
                        mol_type = protein
                        organism = Gallus gallus
SEQUENCE: 157
RVVIQPSPVV VTLPGP                                                   16

SEQ ID NO: 158          moltype = AA  length = 18
FEATURE                 Location/Qualifiers
source                  1..18
                        mol_type = protein
                        organism = Gallus gallus
SEQUENCE: 158
SAAVGSILSE EGVPISSG                                                 18

SEQ ID NO: 159          moltype = AA  length = 16
FEATURE                 Location/Qualifiers
source                  1..16
                        mol_type = protein
                        organism = Gallus gallus
SEQUENCE: 159
VVVTLPGPIL SSFPQN                                                   16

SEQ ID NO: 160          moltype = AA  length = 18
FEATURE                 Location/Qualifiers
source                  1..18
                        mol_type = protein
                        organism = Gallus gallus
SEQUENCE: 160
GVPISSGGFG ISGLGSRF                                                 18

SEQ ID NO: 161          moltype = AA  length = 17
FEATURE                 Location/Qualifiers
source                  1..17
                        mol_type = protein
                        organism = Gallus gallus
SEQUENCE: 161
PSPVVVTLPG PILSSFP                                                  17

SEQ ID NO: 162          moltype = AA  length = 17
FEATURE                 Location/Qualifiers
source                  1..17
                        mol_type = protein
                        organism = Gallus gallus
SEQUENCE: 162
VAIQPPPVVV TLPGPIL                                                  17

SEQ ID NO: 163          moltype = AA  length = 17
FEATURE                 Location/Qualifiers
source                  1..17
                        mol_type = protein
                        organism = Gallus gallus
SEQUENCE: 163
VIQPSPVVVT LPGPILS                                                  17

SEQ ID NO: 164          moltype = AA  length = 17
FEATURE                 Location/Qualifiers
source                  1..17
                        mol_type = protein
                        organism = Gallus gallus
SEQUENCE: 164
VVIQPSPVVV TLPGPIL                                                  17

SEQ ID NO: 165          moltype = AA  length = 17
FEATURE                 Location/Qualifiers
source                  1..17
                        mol_type = protein
                        organism = Gallus gallus
SEQUENCE: 165
SPVVVTLPGP ILSSFPQ                                                  17

SEQ ID NO: 166          moltype = AA  length = 15
FEATURE                 Location/Qualifiers
source                  1..15
                        mol_type = protein
                        organism = Gallus gallus
SEQUENCE: 166
VILSNTKTQY SIKIH                                                    15
```

```
SEQ ID NO: 167          moltype = AA  length = 17
FEATURE                 Location/Qualifiers
source                  1..17
                        mol_type = protein
                        organism = Gallus gallus
SEQUENCE: 167
SRVVIQPSPV VVTLPGP                                                   17

SEQ ID NO: 168          moltype = AA  length = 17
FEATURE                 Location/Qualifiers
source                  1..17
                        mol_type = protein
                        organism = Gallus gallus
SEQUENCE: 168
DSRVVIQPSP VVVTLPG                                                   17

SEQ ID NO: 169          moltype = AA  length = 17
FEATURE                 Location/Qualifiers
source                  1..17
                        mol_type = protein
                        organism = Gallus gallus
SEQUENCE: 169
PVVVTLPGPI LSSFPQN                                                   17

SEQ ID NO: 170          moltype = AA  length = 17
FEATURE                 Location/Qualifiers
source                  1..17
                        mol_type = protein
                        organism = Gallus gallus
SEQUENCE: 170
RVVIQPSPVV VTLPGPI                                                   17

SEQ ID NO: 171          moltype = AA  length = 19
FEATURE                 Location/Qualifiers
source                  1..19
                        mol_type = protein
                        organism = Gallus gallus
SEQUENCE: 171
GVPISSGGFG ISGLGSRFS                                                 19

SEQ ID NO: 172          moltype = AA  length = 18
FEATURE                 Location/Qualifiers
source                  1..18
                        mol_type = protein
                        organism = Gallus gallus
SEQUENCE: 172
SVAIQPPPVV VTLPGPIL                                                  18

SEQ ID NO: 173          moltype = AA  length = 18
FEATURE                 Location/Qualifiers
source                  1..18
                        mol_type = protein
                        organism = Gallus gallus
SEQUENCE: 173
VAIQPPPVVV TLPGPILS                                                  18

SEQ ID NO: 174          moltype = AA  length = 18
FEATURE                 Location/Qualifiers
source                  1..18
                        mol_type = protein
                        organism = Gallus gallus
SEQUENCE: 174
VVIQPSPVVV TLPGPILS                                                  18

SEQ ID NO: 175          moltype = AA  length = 18
FEATURE                 Location/Qualifiers
source                  1..18
                        mol_type = protein
                        organism = Gallus gallus
SEQUENCE: 175
PSPVVVTLPG PILSSFPQ                                                  18

SEQ ID NO: 176          moltype = AA  length = 20
FEATURE                 Location/Qualifiers
source                  1..20
                        mol_type = protein
                        organism = Gallus gallus
SEQUENCE: 176
```

```
GVPISSGGFG ISGLGSRFSG                                          20

SEQ ID NO: 177          moltype = AA  length = 18
FEATURE                 Location/Qualifiers
source                  1..18
                        mol_type = protein
                        organism = Gallus gallus
SEQUENCE: 177
AVPLVRPVTM VPSIPGIP                                            18

SEQ ID NO: 178          moltype = AA  length = 18
FEATURE                 Location/Qualifiers
source                  1..18
                        mol_type = protein
                        organism = Gallus gallus
SEQUENCE: 178
PPPVVVTLPG PILSSFPQ                                            18

SEQ ID NO: 179          moltype = AA  length = 18
FEATURE                 Location/Qualifiers
source                  1..18
                        mol_type = protein
                        organism = Gallus gallus
SEQUENCE: 179
SPVVVTLPGP ILSSFPQN                                            18

SEQ ID NO: 180          moltype = AA  length = 18
FEATURE                 Location/Qualifiers
source                  1..18
                        mol_type = protein
                        organism = Gallus gallus
SEQUENCE: 180
LPGPGLQLLH GTTTLAFK                                            18

SEQ ID NO: 181          moltype = AA  length = 18
FEATURE                 Location/Qualifiers
source                  1..18
                        mol_type = protein
                        organism = Gallus gallus
SEQUENCE: 181
PPPVVVTFPG PILSSFPQ                                            18

SEQ ID NO: 182          moltype = AA  length = 19
FEATURE                 Location/Qualifiers
source                  1..19
                        mol_type = protein
                        organism = Gallus gallus
SEQUENCE: 182
SVAIQPPPVV VTLPGPILS                                           19

SEQ ID NO: 183          moltype = AA  length = 19
FEATURE                 Location/Qualifiers
source                  1..19
                        mol_type = protein
                        organism = Gallus gallus
SEQUENCE: 183
SSVAIQPPPV VVTLPGPIL                                           19

SEQ ID NO: 184          moltype = AA  length = 18
FEATURE                 Location/Qualifiers
source                  1..18
                        mol_type = protein
                        organism = Gallus gallus
SEQUENCE: 184
RVVIQPSPVV VTLPGPIL                                            18

SEQ ID NO: 185          moltype = AA  length = 19
FEATURE                 Location/Qualifiers
source                  1..19
                        mol_type = protein
                        organism = Gallus gallus
SEQUENCE: 185
PSPVVVTLPG PILSSFPQN                                           19

SEQ ID NO: 186          moltype = AA  length = 21
FEATURE                 Location/Qualifiers
source                  1..21
                        mol_type = protein
                        organism = Gallus gallus
```

```
SEQUENCE: 186
SILSEEGVPI SSGGFGISGL G                                          21

SEQ ID NO: 187          moltype = AA  length = 19
FEATURE                 Location/Qualifiers
source                  1..19
                        mol_type = protein
                        organism = Gallus gallus
SEQUENCE: 187
SRVVIQPSPV VVTLPGPIL                                             19

SEQ ID NO: 188          moltype = AA  length = 19
FEATURE                 Location/Qualifiers
source                  1..19
                        mol_type = protein
                        organism = Gallus gallus
SEQUENCE: 188
RVVIQPSPVV VTLPGPILS                                             19

SEQ ID NO: 189          moltype = AA  length = 22
FEATURE                 Location/Qualifiers
source                  1..22
                        mol_type = protein
                        organism = Gallus gallus
SEQUENCE: 189
SVPIGAGGSL GLGGFGWSGL GR                                         22

SEQ ID NO: 190          moltype = AA  length = 22
FEATURE                 Location/Qualifiers
source                  1..22
                        mol_type = protein
                        organism = Gallus gallus
SEQUENCE: 190
TAVGSSTSAA VGSILSEEGV PI                                         22

SEQ ID NO: 191          moltype = AA  length = 22
FEATURE                 Location/Qualifiers
source                  1..22
                        mol_type = protein
                        organism = Gallus gallus
SEQUENCE: 191
SAAVGSILSE EGVPISSGGF GI                                         22

SEQ ID NO: 192          moltype = AA  length = 21
FEATURE                 Location/Qualifiers
source                  1..21
                        mol_type = protein
                        organism = Gallus gallus
SEQUENCE: 192
SEEGVPISSG GFGISGLGSR F                                          21

SEQ ID NO: 193          moltype = AA  length = 20
FEATURE                 Location/Qualifiers
source                  1..20
                        mol_type = protein
                        organism = Gallus gallus
SEQUENCE: 193
SRVVIQPSPV VVTLPGPILS                                            20

SEQ ID NO: 194          moltype = AA  length = 23
FEATURE                 Location/Qualifiers
source                  1..23
                        mol_type = protein
                        organism = Gallus gallus
SEQUENCE: 194
SVPIGAGGSL GLGGFGWSGL GRG                                        23

SEQ ID NO: 195          moltype = AA  length = 20
FEATURE                 Location/Qualifiers
source                  1..20
                        mol_type = protein
                        organism = Gallus gallus
SEQUENCE: 195
DSRVVIQPSP VVVTLPGPIL                                            20

SEQ ID NO: 196          moltype = AA  length = 23
FEATURE                 Location/Qualifiers
source                  1..23
                        mol_type = protein
```

```
                         organism = Gallus gallus
SEQUENCE: 196
TAVGSSTSAA VGSILSEEGV PIS                                          23

SEQ ID NO: 197           moltype = AA  length = 22
FEATURE                  Location/Qualifiers
source                   1..22
                         mol_type = protein
                         organism = Gallus gallus
SEQUENCE: 197
LRGDVGPVGR TGEQGIAGPP GF                                           22

SEQ ID NO: 198           moltype = AA  length = 21
FEATURE                  Location/Qualifiers
source                   1..21
                         mol_type = protein
                         organism = Gallus gallus
SEQUENCE: 198
SRVVIQPSPV VVTLPGPILS S                                            21

SEQ ID NO: 199           moltype = AA  length = 21
FEATURE                  Location/Qualifiers
source                   1..21
                         mol_type = protein
                         organism = Gallus gallus
SEQUENCE: 199
VVIQPSPVVV TLPGPILSSF P                                            21

SEQ ID NO: 200           moltype = AA  length = 22
FEATURE                  Location/Qualifiers
source                   1..22
                         mol_type = protein
                         organism = Gallus gallus
SEQUENCE: 200
GVPISSGGFG ISGLGSRFSG RR                                           22

SEQ ID NO: 201           moltype = AA  length = 24
FEATURE                  Location/Qualifiers
source                   1..24
                         mol_type = protein
                         organism = Gallus gallus
SEQUENCE: 201
SVPIGAGGSL GLGGFGWSGL GRGL                                         24

SEQ ID NO: 202           moltype = AA  length = 21
FEATURE                  Location/Qualifiers
source                   1..21
                         mol_type = protein
                         organism = Gallus gallus
SEQUENCE: 202
DSRVVIQPSP VVVTLPGPIL S                                            21

SEQ ID NO: 203           moltype = AA  length = 21
FEATURE                  Location/Qualifiers
source                   1..21
                         mol_type = protein
                         organism = Gallus gallus
SEQUENCE: 203
VIQPSPVVVT LPGPILSSFP Q                                            21

SEQ ID NO: 204           moltype = AA  length = 24
FEATURE                  Location/Qualifiers
source                   1..24
                         mol_type = protein
                         organism = Gallus gallus
SEQUENCE: 204
AVGSILSEEG VPISSGGFGI SGLG                                         24

SEQ ID NO: 205           moltype = AA  length = 21
FEATURE                  Location/Qualifiers
source                   1..21
                         mol_type = protein
                         organism = Gallus gallus
SEQUENCE: 205
RVVIQPSPVV VTLPGPILSS F                                            21

SEQ ID NO: 206           moltype = AA  length = 23
FEATURE                  Location/Qualifiers
source                   1..23
```

```
                        mol_type = protein
                        organism = Gallus gallus
SEQUENCE: 206
SILSEEGVPI SSGGFGISGL GSR                                            23

SEQ ID NO: 207          moltype = AA  length = 21
FEATURE                 Location/Qualifiers
source                  1..21
                        mol_type = protein
                        organism = Gallus gallus
SEQUENCE: 207
IPSSVPESSF KIKGNSSSFH I                                              21

SEQ ID NO: 208          moltype = AA  length = 22
FEATURE                 Location/Qualifiers
source                  1..22
                        mol_type = protein
                        organism = Gallus gallus
SEQUENCE: 208
VAIQPPPVVV TLPGPILSSF PQ                                             22

SEQ ID NO: 209          moltype = AA  length = 25
FEATURE                 Location/Qualifiers
source                  1..25
                        mol_type = protein
                        organism = Gallus gallus
SEQUENCE: 209
TAVGSSTSAA VGSILSEEGV PISSG                                          25

SEQ ID NO: 210          moltype = AA  length = 22
FEATURE                 Location/Qualifiers
source                  1..22
                        mol_type = protein
                        organism = Gallus gallus
SEQUENCE: 210
VVIQPSPVVV TLPGPILSSF PQ                                             22

SEQ ID NO: 211          moltype = AA  length = 23
FEATURE                 Location/Qualifiers
source                  1..23
                        mol_type = protein
                        organism = Gallus gallus
SEQUENCE: 211
PSPVVVTLPG PILSSFPQNT AVG                                            23

SEQ ID NO: 212          moltype = AA  length = 20
FEATURE                 Location/Qualifiers
source                  1..20
                        mol_type = protein
                        organism = Gallus gallus
SEQUENCE: 212
KENFEVLCKD GTRKPVTDAE                                                20

SEQ ID NO: 213          moltype = AA  length = 21
FEATURE                 Location/Qualifiers
source                  1..21
                        mol_type = protein
                        organism = Gallus gallus
SEQUENCE: 213
SIQACKLAQS HGWGVMVSHR S                                              21

SEQ ID NO: 214          moltype = AA  length = 22
FEATURE                 Location/Qualifiers
source                  1..22
                        mol_type = protein
                        organism = Gallus gallus
SEQUENCE: 214
SRVVIQPSPV VVTLPGPILS SF                                             22

SEQ ID NO: 215          moltype = AA  length = 22
FEATURE                 Location/Qualifiers
source                  1..22
                        mol_type = protein
                        organism = Gallus gallus
SEQUENCE: 215
RVVIQPSPVV VTLPGPILSS FP                                             22

SEQ ID NO: 216          moltype = AA  length = 23
FEATURE                 Location/Qualifiers
```

```
source                  1..23
                        mol_type = protein
                        organism = Gallus gallus
SEQUENCE: 216
EQPPLCVASV SVKEPASETP AVP                                         23

SEQ ID NO: 217          moltype = AA  length = 23
FEATURE                 Location/Qualifiers
source                  1..23
                        mol_type = protein
                        organism = Gallus gallus
SEQUENCE: 217
SVAIQPPPVV VTLPGPILSS FPQ                                         23

SEQ ID NO: 218          moltype = AA  length = 26
FEATURE                 Location/Qualifiers
source                  1..26
                        mol_type = protein
                        organism = Gallus gallus
SEQUENCE: 218
SAAVGSILSE EGVPISSGGF GISGLG                                      26

SEQ ID NO: 219          moltype = AA  length = 24
FEATURE                 Location/Qualifiers
source                  1..24
                        mol_type = protein
                        organism = Gallus gallus
SEQUENCE: 219
SILSEEGVPI SSGGFGISGL GSRF                                        24

SEQ ID NO: 220          moltype = AA  length = 24
FEATURE                 Location/Qualifiers
source                  1..24
                        mol_type = protein
                        organism = Gallus gallus
SEQUENCE: 220
PSPVVVTLPG PILSSFPQNT AVGS                                        24

SEQ ID NO: 221          moltype = AA  length = 23
FEATURE                 Location/Qualifiers
source                  1..23
                        mol_type = protein
                        organism = Gallus gallus
SEQUENCE: 221
VVIQPSPVVV TLPGPILSSF PQN                                         23

SEQ ID NO: 222          moltype = AA  length = 23
FEATURE                 Location/Qualifiers
source                  1..23
                        mol_type = protein
                        organism = Gallus gallus
SEQUENCE: 222
SRVVIQPSPV VVTLPGPILS SFP                                         23

SEQ ID NO: 223          moltype = AA  length = 24
FEATURE                 Location/Qualifiers
source                  1..24
                        mol_type = protein
                        organism = Gallus gallus
SEQUENCE: 223
SSVAIQPPPV VVTLPGPILS SFPQ                                        24

SEQ ID NO: 224          moltype = AA  length = 23
FEATURE                 Location/Qualifiers
source                  1..23
                        mol_type = protein
                        organism = Gallus gallus
SEQUENCE: 224
RVVIQPSPVV VTLPGPILSS FPQ                                         23

SEQ ID NO: 225          moltype = AA  length = 25
FEATURE                 Location/Qualifiers
source                  1..25
                        mol_type = protein
                        organism = Gallus gallus
SEQUENCE: 225
SILSEEGVPI SSGGFGISGL GSRFS                                       25

SEQ ID NO: 226          moltype = AA  length = 27
```

```
FEATURE                Location/Qualifiers
source                 1..27
                       mol_type = protein
                       organism = Gallus gallus
SEQUENCE: 226
TSAAVGSILS EEGVPISSGG FGISGLG                                          27

SEQ ID NO: 227         moltype = AA  length = 26
FEATURE                Location/Qualifiers
source                 1..26
                       mol_type = protein
                       organism = Gallus gallus
SEQUENCE: 227
SILSEEGVPI SSGGFGISGL GSRFSG                                           26

SEQ ID NO: 228         moltype = AA  length = 24
FEATURE                Location/Qualifiers
source                 1..24
                       mol_type = protein
                       organism = Gallus gallus
SEQUENCE: 228
SRVVIQPSPV VVTLPGPILS SFPQ                                             24

SEQ ID NO: 229         moltype = AA  length = 28
FEATURE                Location/Qualifiers
source                 1..28
                       mol_type = protein
                       organism = Gallus gallus
SEQUENCE: 229
TAVGSSTSAA VGSILSEEGV PISSGGFG                                         28

SEQ ID NO: 230         moltype = AA  length = 28
FEATURE                Location/Qualifiers
source                 1..28
                       mol_type = protein
                       organism = Gallus gallus
SEQUENCE: 230
STSAAVGSIL SEEGVPISSG GFGISGLG                                         28

SEQ ID NO: 231         moltype = AA  length = 24
FEATURE                Location/Qualifiers
source                 1..24
                       mol_type = protein
                       organism = Gallus gallus
SEQUENCE: 231
RVVIQPSPVV VTLPGPILSS FPQN                                             24

SEQ ID NO: 232         moltype = AA  length = 25
FEATURE                Location/Qualifiers
source                 1..25
                       mol_type = protein
                       organism = Gallus gallus
SEQUENCE: 232
SRVVIQPSPV VVTLPGPILS SFPQN                                            25

SEQ ID NO: 233         moltype = AA  length = 25
FEATURE                Location/Qualifiers
source                 1..25
                       mol_type = protein
                       organism = Gallus gallus
SEQUENCE: 233
DSRVVIQPSP VVVTLPGPIL SSFPQ                                            25

SEQ ID NO: 234         moltype = AA  length = 29
FEATURE                Location/Qualifiers
source                 1..29
                       mol_type = protein
                       organism = Gallus gallus
SEQUENCE: 234
TAVGSSTSAA VGSILSEEGV PISSGGFGI                                        29

SEQ ID NO: 235         moltype = AA  length = 29
FEATURE                Location/Qualifiers
source                 1..29
                       mol_type = protein
                       organism = Gallus gallus
SEQUENCE: 235
SAAVGSILSE EGVPISSGGF GISGLGSRF                                        29
```

```
SEQ ID NO: 236          moltype = AA  length = 24
FEATURE                 Location/Qualifiers
source                  1..24
                        mol_type = protein
                        organism = Gallus gallus
SEQUENCE: 236
VEQLVNLQHL DVAYNLLLEH AQLA                                          24

SEQ ID NO: 237          moltype = AA  length = 28
FEATURE                 Location/Qualifiers
source                  1..28
                        mol_type = protein
                        organism = Gallus gallus
SEQUENCE: 237
SVAIQPPPVV VTLPGPILSS FPQSTAVG                                      28

SEQ ID NO: 238          moltype = AA  length = 28
FEATURE                 Location/Qualifiers
source                  1..28
                        mol_type = protein
                        organism = Gallus gallus
SEQUENCE: 238
SILSEEGVPI SSGGFGISGL GSRFSGRR                                      28

SEQ ID NO: 239          moltype = AA  length = 30
FEATURE                 Location/Qualifiers
source                  1..30
                        mol_type = protein
                        organism = Gallus gallus
SEQUENCE: 239
TSAAVGSILS EEGVPISSGG FGISGLGSRF                                    30

SEQ ID NO: 240          moltype = AA  length = 29
FEATURE                 Location/Qualifiers
source                  1..29
                        mol_type = protein
                        organism = Gallus gallus
SEQUENCE: 240
SSVAIQPPPV VVTLPGPILS SFPQSTAVG                                     29

SEQ ID NO: 241          moltype = AA  length = 31
FEATURE                 Location/Qualifiers
source                  1..31
                        mol_type = protein
                        organism = Gallus gallus
SEQUENCE: 241
STSAAVGSIL SEEGVPISSG GFGISGLGSR F                                  31

SEQ ID NO: 242          moltype = AA  length = 31
FEATURE                 Location/Qualifiers
source                  1..31
                        mol_type = protein
                        organism = Gallus gallus
SEQUENCE: 242
PSPVVVTLPG PILSSFPQNT AVGSSTSAAV G                                  31

SEQ ID NO: 243          moltype = AA  length = 33
FEATURE                 Location/Qualifiers
source                  1..33
                        mol_type = protein
                        organism = Gallus gallus
SEQUENCE: 243
TAVGSSTSAA VGSILSEEGV PISSGGFGIS GLG                                33

SEQ ID NO: 244          moltype = AA  length = 31
FEATURE                 Location/Qualifiers
source                  1..31
                        mol_type = protein
                        organism = Gallus gallus
SEQUENCE: 244
AVGSILSEEG VPISSGGFGI SGLGSRFSGR R                                  31

SEQ ID NO: 245          moltype = AA  length = 27
FEATURE                 Location/Qualifiers
source                  1..27
                        mol_type = protein
                        organism = Gallus gallus
SEQUENCE: 245
NKVLVHCAMG RSRSATLVLA YLMIYKN                                       27
```

```
SEQ ID NO: 246          moltype = AA  length = 32
FEATURE                 Location/Qualifiers
source                  1..32
                        mol_type = protein
                        organism = Gallus gallus
SEQUENCE: 246
SSVAIQPPPV VVTLPGPILS SFPQSTAVGS TA                                  32

SEQ ID NO: 247          moltype = AA  length = 32
FEATURE                 Location/Qualifiers
source                  1..32
                        mol_type = protein
                        organism = Gallus gallus
SEQUENCE: 247
AAVGSILSEE GVPISSGGFG ISGLGSRFSG RR                                  32

SEQ ID NO: 248          moltype = AA  length = 35
FEATURE                 Location/Qualifiers
source                  1..35
                        mol_type = protein
                        organism = Gallus gallus
SEQUENCE: 248
TAVGSSTSAA VGSILSEEGV PISSGGFGIS GLGSR                               35

SEQ ID NO: 249          moltype = AA  length = 33
FEATURE                 Location/Qualifiers
source                  1..33
                        mol_type = protein
                        organism = Gallus gallus
SEQUENCE: 249
SAAVGSILSE EGVPISSGGF GISGLGSRFS GRR                                 33

SEQ ID NO: 250          moltype = AA  length = 34
FEATURE                 Location/Qualifiers
source                  1..34
                        mol_type = protein
                        organism = Gallus gallus
SEQUENCE: 250
PSPVVVTLPG PILSSFPQNT AVGSSTSAAV GSIL                                34

SEQ ID NO: 251          moltype = AA  length = 35
FEATURE                 Location/Qualifiers
source                  1..35
                        mol_type = protein
                        organism = Gallus gallus
SEQUENCE: 251
PSPVVVTLPG PILSSFPQNT AVGSSTSAAV GSILS                               35

SEQ ID NO: 252          moltype = AA  length = 36
FEATURE                 Location/Qualifiers
source                  1..36
                        mol_type = protein
                        organism = Gallus gallus
SEQUENCE: 252
TAVGSSTSAA VGSILSEEGV PISSGGFGIS GLGSRF                              36

SEQ ID NO: 253          moltype = AA  length = 29
FEATURE                 Location/Qualifiers
source                  1..29
                        mol_type = protein
                        organism = Gallus gallus
SEQUENCE: 253
RPRVYLHCTN PRHPKYREGD VTLFALNLS                                      29
```